Figure 1:
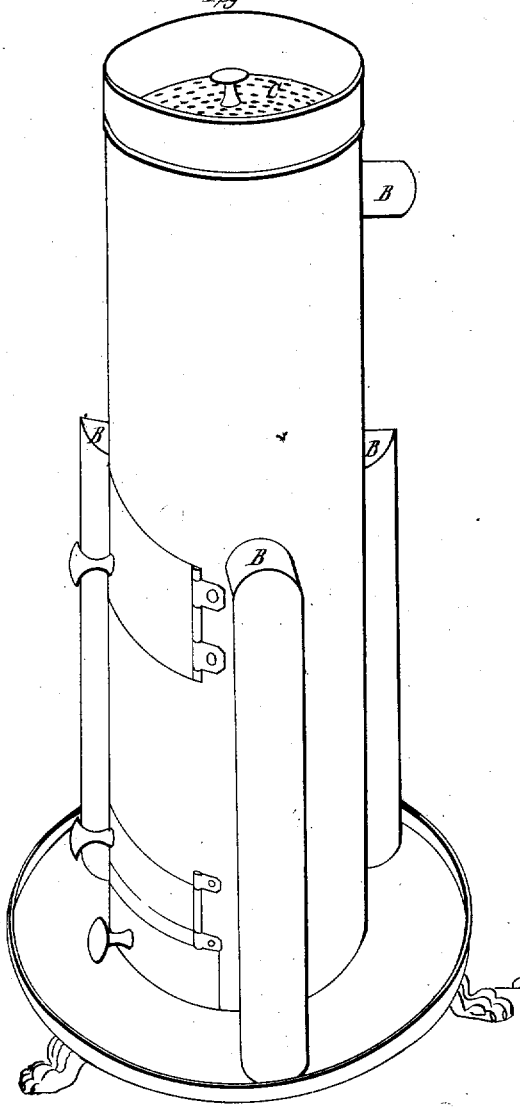
Figure 2:
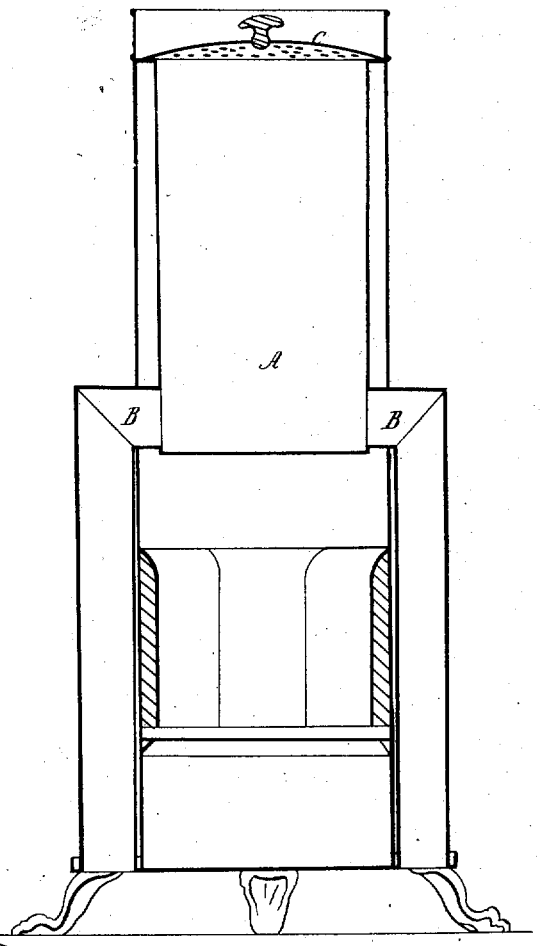

8714X

H. Hubbard.

Heating Drum.

Patented Mar. 25, 1835.

Mar. 25. 1835 8714X
3/25/1835 4

D. Harvey Hubbard Berlin Conn.

Letters Patent

The Schedule referred to in these Letters Patent and making part of the same
containing a description in the words of the said Harvey Hubbard himself
of his improvement in the Common Furnace Stove in the mode of generating
heated air and radiating heat . . . . . . . . . . . . . . .

To all to whom these presents shall come, Be it known that I Harvey Hubbard
of Berlin in the County of Hartford and State of Connecticut a citizen of said
State and of the United States have invented a new and useful improvement
in the Common Furnace Stove in the mode of generating heated air and
radiating heat, and that the following is a full and exact description of
the construction and operation of said instrument as improved by me.
This improvement consists in an addition to the Common Furnace Stove by
means of which heat is radiated directly into the surrounding space more
rapidly than by the common method, and air is heated in the body of the
Stove and then diffused through the place to be warmed in an improved and
economical manner; these objects are accomplished by inserting one or more
Cylinders or pipes in the upper part of the Common furnace Stove and cau-
sing the air to circulate freely through the internal Cylinders or pipes in-
serted in said upper part. The most improved and convenient construc-
tion is as follows, Insert in the upper part of the Stove a Cylinder open above and
closed at bottom and concentric with the upper part of the Stove and make
this internal Cylinder commence a suitable distance from the grate to
give room for the fuel to burn freely in the usual quantity and manner and
continue this inner Cylinder to nearly or quite the top of the Stove and make
it so near to the size of the upper part of the Stove that there will be sufficient
space between the inner and outer Cylinders to form a free draught for the Stove
and cause this space to be closed at or near the top and by this means the
upper part of the Stove will be materially improved for it will radiate heat more rapidly than a Stove with a Common upper part or top If the upper part of the Stove is twelve inches in diameter the inner Cylinder may be about nine and one half inches or ten inches in diameter making a distance of about one & one half inches or one inch more or less between the Cylinders and in the same proportion for smaller or larger Stoves To generate heated air in the body of the Stove and diffuse the same through the space to be warmed make similar openings say three or more as near as practicable to the bottom of the inner Cylinder. These openings may be made by pipes Commencing on the inside of the inner Cylinder and extending horizontally through the adjoining Space and through the outside of the Stove and carefully fitted in and thus making a free Communication between the external air and the inside of the inner Cylinder Leading pipes may be inserted in these openings extending downward by the outside of the Stove and terminating at any Convenient point above or below or at the bottom of the Stove. Such leading pipes are not essential to the improvement but useful to take the air to be heated from the lower part of the Surrounding Space and to give the air greater Cir-culation For a twelve inch Stove three pipes of about three inches in diameter each will be found suitable but the size may be varied as found Convenient For Stoves of other sizes the same proportions can be observed The materials used may be Sheet or Cast iron or other suitable Metal A perforated Cover may be placed over the top of the inner Cylinder when at pleasure and such ornaments used as fancy may devise.

What I Claim as my improvement and for which I take a Patent is the addition of the inner Cylinder in the upper part of the Stove with openings into said Cylinder at the bottom thereof Communicating with the external air in the manner above described and thus increa-sing the quantity of heat radiated from the upper part of the Stove and at the same time generating heated air in the body of the Stove and diffusing it through the adjoining Space in a Convenient and econom-ical manner. I Claim no other part or parts of the instrument than those above described and I do not Claim any right to radiate heat or generate heated air in one or more Cylinders separated from the body

8714X of the stove as it were in illustrating Patent Stoves. In testimony that the above and foregoing is a true Specification of my said improvement I hereunto set my hand and seal at New Haven this twenty fifth day of February AD 1835

Witnesses: Samuel S. Hitchcock, Edwin Hutton

Harvey Hubbard 9 p 4 wds (Patented March 25. 1835)

(Drawing.)